United States Patent
Yang et al.

(10) Patent No.: US 10,764,373 B2
(45) Date of Patent: Sep. 1, 2020

(54) METHOD AND APPARATUS FOR DETERMINING COOPERATION NODE

(71) Applicant: ZTE CORPORATION, Shenzhen, Guangdong (CN)

(72) Inventors: Kun Yang, Shenzhen (CN); Hao Wu, Shenzhen (CN); Songjie Liu, Shenzhen (CN); Jing Ren, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 16/321,993

(22) PCT Filed: Mar. 1, 2017

(86) PCT No.: PCT/CN2017/075360
§ 371 (c)(1),
(2) Date: Jan. 30, 2019

(87) PCT Pub. No.: WO2018/023971
PCT Pub. Date: Feb. 8, 2018

(65) Prior Publication Data
US 2019/0190990 A1  Jun. 20, 2019

(30) Foreign Application Priority Data

Aug. 4, 2016 (CN) .......................... 2016 1 0635638
Nov. 4, 2016 (CN) .......................... 2016 1 0977531

(51) Int. Cl.
*H04L 12/26* (2006.01)
*H04L 29/06* (2006.01)
(Continued)

(52) U.S. Cl.
CPC .............. *H04L 67/12* (2013.01); *H04L 29/08* (2013.01); *H04L 41/0806* (2013.01);
(Continued)

(58) Field of Classification Search
CPC ............ H04L 41/0806; H04L 67/1095; H04L 67/1097
(Continued)

(56) References Cited

U.S. PATENT DOCUMENTS 9,317,378 B2 * 4/2016 Vasseur .................. H04L 45/00
2008/0043758 A1 * 2/2008 Giaretta .............. H04L 63/0892
370/400
(Continued)

FOREIGN PATENT DOCUMENTS

CN  101060479 A  10/2007
CN  101557630 A  10/2009
(Continued)

OTHER PUBLICATIONS

"Topology-Based Proactive Network Protection in Large-Scale Failure Scenarios"—Izaddoost et al, University of Ontario Institute of Technology, Oshawa, Ontario, Canada, Oct. 2014 https://core.ac.uk/download/pdf/82812154.pdf (Year: 2014).*
(Continued)

*Primary Examiner* — Randy A Scott
(74) *Attorney, Agent, or Firm* — Foley & Lardner LLP

(57) ABSTRACT

Provided is a method and apparatus for determining a cooperation node. The method includes: acquiring first location information of a target node when it is required to allocate a cooperation node to the target node; and selecting, from a plurality of nodes, the cooperation node satisfying a preset location requirement for the target node based on the first location information, where the plurality of nodes and the target node are located in a same network, and the preset location requirement refers to that the target node and the cooperation node do not have a common parent node or have a lowest-level common parent node closest to a root node.

17 Claims, 6 Drawing Sheets

(51) Int. Cl.
  *H04L 29/08* (2006.01)
  *H04L 29/14* (2006.01)
  *H04L 12/24* (2006.01)
  *H04L 12/911* (2013.01)
(52) U.S. Cl.
  CPC .............. *H04L 47/70* (2013.01); *H04L 67/18* (2013.01); *H04L 67/28* (2013.01); *H04L 69/40* (2013.01)
(58) Field of Classification Search
  USPC ........ 709/221, 223, 224, 230, 232; 370/216, 370/254, 338
  See application file for complete search history.

(56) References Cited

U.S. PATENT DOCUMENTS

| | | | |
|---|---|---|---|
| 2013/0016605 A1* | 1/2013 | Chen | ........................ H04L 45/02 370/221 |
| 2014/0222730 A1 | 8/2014 | Vasseur et al. | |
| 2016/0004759 A1 | 1/2016 | Ramakrishnan et al. | |
| 2016/0026542 A1 | 1/2016 | Vasseur et al. | |
| 2016/0149805 A1* | 5/2016 | Hui | ..................... H04W 40/125 370/389 |

FOREIGN PATENT DOCUMENTS

| | | |
|---|---|---|
| CN | 101873661 A | 10/2010 |
| EP | 2 974 456 A1 | 1/2016 |

OTHER PUBLICATIONS

International Search Report and Written Opinion for International Appl. No. PCT/CN2017/075360, dated Jun. 6, 2017.
Extended European Search Report for EP Appl. No. 17836156.4, dated Dec. 13, 2019.

* cited by examiner

METHOD AND APPARATUS FOR DETERMINING COOPERATION NODE

CROSS-REFERENCE TO RELATED APPLICATIONS

This is a National Stage Application, under 35 U.S.C. 371, of International Patent Application No. PCT/CN2017/075360, filed on Mar. 1, 2017, which claims priority to Chinese Patent Applications No. 201610635638.1 filed on Aug. 4, 2016, and No. 201610977531.5 filed on Nov. 4, 2016, contents of all of which are incorporated herein by reference in their entireties.

TECHNICAL FIELD

The present disclosure relates to the field of communications and, in particular, to a method and apparatus for determining a cooperation node.

BACKGROUND

As the technology of Internet of Things (IoT) is applied in an expanding range, more and more "ubiquitous networks/IoTs" with a large span of space have emerged. To cover these ubiquitous networks with a large span of space, multiple gateways are generally required to be used simultaneously for data collection and transmission. These gateways can be interconnected using an operator network or other private networks. The complex environment of the ubiquitous networks/IoTs and usually unattended terminal devices result in unstable communications. To improve the reliability of information transmission and to satisfy the requirements of IoT applications, it is generally necessary to select cooperation nodes to achieve redundant backup and recovery of data, thereby promoting efficient network data transmission, improving network security and communication reliability, and satisfying core content of specific application requirements.

For example, the rapid economic development and the rapid expansion of cities have made the energy shortage increasingly serious. As a major reform in the energy technology, smart grids have become a current important research hotspot of countries. The smart grids ensure the safety, reliability and economy of electricity use by monitoring power loads and developing power supply plans and price adjustment schemes. Therefore, the safe operation of a grid system is required in the smart grids. When some power devices in a grid trip due to excessive loads or are damaged for natural or human factors, a smart grid needs to judge failure causes in time. However, in the existing smart grid adopting a centralized structure, the collected data is regularly reported to a management center. When a certain power device fails, it takes a period of time to discover the failure. Moreover, a failure cause cannot be found out if the collected data is lost. Therefore, the cooperation nodes need to perform data backup mutually; when one cooperation node is found to be disconnected, another cooperation node takes the place of the one cooperation node to actively report the failure and the collected data in the last backup to the management center.

In the traditional manner of selecting the cooperation nodes, the hop count or physical distance between the cooperation nodes is a main factor for consideration. However, the case where a same failure exists in multiple cooperation nodes has not been considered. Hence, two cooperation nodes are both isolated from a primary network and thus communications cannot be guaranteed and data backup and recovery cannot be conducted.

SUMMARY

The present application provides a method and apparatus for determining a cooperation node to address the failure in data backup and recovery when a node fails.

According to an aspect of the present application, a method for determining a cooperation node is provided. The method includes: acquiring first location information of a target node when it is required to allocate a cooperation node to the target node; and selecting, from a plurality of nodes, the cooperation node satisfying a preset location requirement for the target node based on the first location information, where the plurality of nodes and the target node are located in a same network, and the preset location requirement refers to that the target node and the cooperation node do not have a common parent node or have a lowest-level common parent node closest to a root node.

In one or more embodiments, the selecting, from a plurality of nodes, the cooperation node satisfying a preset location requirement for the target node based on the first location information includes: acquiring a plurality of pieces of second location information of the plurality of nodes, where each of the plurality of nodes corresponds to one piece of second location information; and selecting, from the plurality of nodes and based on the plurality of pieces of second location information and the first location information, a node satisfying the preset location requirement as the cooperation node.

In one or more embodiments, the selecting, from the plurality of node and based on the plurality of pieces of second location information and the first location information, a node satisfying the preset location requirement as the cooperation node includes: acquiring first encoded information for representing the first location information and a plurality of pieces of second encoded information for representing the plurality of pieces of second location information; comparing, from a most significant bit, a plurality of encoded bits of the first encoded information with a plurality of encoded bits of each of the plurality of pieces of second encoded information, and searching the plurality of pieces of second encoded information for target encoded information having a maximum number of continuous non-coincident encoded bits with the first encoded information from the most significant bit; and taking a node corresponding to the target encoded information as the cooperation node.

In one or more embodiments, the comparing, from a most significant bit, a plurality of encoded bits of the first encoded information with a plurality of encoded bits of each of the plurality of pieces of second encoded information, and searching the plurality of pieces of second encoded information for target encoded information having a maximum number of continuous non-coincident encoded bits with the first encoded information from the most significant bit includes: determining a number M of encoded bits of the first encoded information; determining whether the plurality of pieces of second encoded information contains at least one piece of second encoded information having the number M of encoded bits; when it is determined that the plurality of pieces of second encoded information contains the at least one piece of second encoded information having the number M of encoded bits, acquiring, from the at least one piece of second encoded information having the number M of encoded bits, the target encoded information having (M−1) most significant bits different from (M−1) most significant bits of the first encoded information; when it is determined that the plurality of pieces of second encoded information does not contain a piece of second encoded information having the number M of encoded bits, or when failing to acquire, from the at least one piece of second encoded information having the number M of encoded bits, the target encoded information having (M−1) most significant bits different from (M−1) most significant bits of the first encoded information, acquiring, from at least one piece of second encoded information having a number (M−1) of encoded bits, the target encoded information having (M−2) most significant bits different from (M−2) most significant bits of the first encoded information; and when failing to acquire, from at least one piece of second encoded information having a number (M−N) of encoded bits, the target encoded information having (M−N−1) most significant bits different from (M−N−1) most significant bits of the first encoded information, acquiring, from at least one piece of second encoded information having a number (M−N−1) of encoded bits, the target encoded information having (M−N−2) most significant bits different from (M−N−2) most significant bits of the first encoded information, where N is a positive integer greater than 0 and less than (M−1).

In one or more embodiments, after the selecting, from a plurality of nodes, the cooperation node satisfying a preset location requirement for the target node based on the first location information, the method further includes: when a node is added in the same network, acquiring a first node which does not have an optimal cooperation node in the same network. The optimal cooperation node of one node has a same number of encoded bits as the one node and has (M−1) most significant bits different from (M−1) most significant bits of the one node, where M is a number of encoded bits of the one node.

In one or more embodiments, after the selecting, from a plurality of nodes, the cooperation node satisfying a preset location requirement for the target node based on the first location information, or after re-allocating the cooperation node to the first node, each node in the same network has at most two cooperation nodes.

In one or more embodiments, after the acquiring first location information of a target node, the method further includes: configuring encoded information for each node in the same network.

In one or more embodiments, the configuring encoded information for each node in the same network includes: acquiring a tree network corresponding to the same network and configuring encoded information Ni for a node at a second level of the tree network, where i is a serial number of the node at the second level, i is a positive integer, and the node at the second level is a subnode of the root node in the tree network; and configuring, encoded information Nkp for a node at a j-th level of the tree network, where j is a positive integer greater than 2, k is a serial number of a parent node of the node at the j-th level, and p is a positive integer.

In one or more embodiments, each node in the same network is a terminal or a gateway.

In one or more embodiments, the method for determining the cooperation node in the present application is applied to any node in the same network.

According to another aspect of the present application, an apparatus for determining a cooperation node is provided. The apparatus includes: a first acquisition unit, which is configured to acquire first location information of a target node when it is required to allocate a cooperation node to the target node; and a selection unit, which is configured to select, from a plurality of nodes, the cooperation node satisfying a preset location requirement for the target node based on the first location information, where the plurality of nodes and the target node are located in a same network, and the preset location requirement refers to that the target node and the cooperation node do not have a common parent node or have a lowest-level common parent node closest to a root node.

In one or more embodiments, the selection unit includes: an acquisition module, which is configured to acquire a plurality of pieces of second location information of the plurality of nodes, where each of the plurality of nodes corresponds to one piece of second location information; and a selection module, which is configured to select, from the plurality of nodes and based on the plurality of pieces of second location information and the first location information, a node satisfying the preset location requirement as the cooperation node.

In one or more embodiments, the selection module includes: a first acquisition submodule, which is configured to acquire first encoded information for representing the first location information and a plurality of pieces of second encoded information for representing the plurality of pieces of second location information; a search submodule, which is configured to compare, from a most significant bit, a plurality of encoded bits of the first encoded information with a plurality of encoded bits of each of the plurality of pieces of second encoded information, and search the plurality of pieces of second encoded information for target encoded information having a maximum number of continuous non-coincident encoded bits with the first encoded information from the most significant bit; and an operation submodule, which is configured to take a node corresponding to the target encoded information as the cooperation node.

In one or more embodiments, the search submodule includes: a determination submodule, which is configured to determine a number M of encoded bits of the first encoded information; a determining submodule, which is configured to determine whether the plurality of pieces of second encoded information contains at least one piece of second encoded information having the number M of encoded bits; a second acquisition submodule, which is configured to acquire, from the at least one piece of second encoded information having the number M of encoded bits, the target encoded information having (M−1) most significant bits different from (M−1) most significant bits of the first encoded information when it is determined that the plurality of pieces of second encoded information contains the at least one piece of second encoded information having the number M of encoded bits; a third acquisition submodule, which is configured to acquire, from at least one piece of second encoded information having a number (M−1) of encoded bits, the target encoded information having (M−2) most significant bits different from (M−2) most significant bits of the first encoded information when it is determined that the plurality of pieces of second encoded information does not contain a piece of second encoded information having the number M of encoded bits, or when the second acquisition submodule fails to acquire, from the at least one piece of second encoded information having the number M of encoded bits, the target encoded information having (M−1) most significant bits different from (M−1) most significant bits of the first encoded information; and a fourth acquisition submodule, which is configured to acquire, from at least one piece of second encoded information having a number (M−N−1) of encoded bits, the target encoded information having (M−N−2) most significant bits different from (M−N−

2) most significant bits of the first encoded information, when failing to acquire, from at least one piece of second encoded information having a number (M−N) of encoded bits, the target encoded information having (M−N−1) most significant bits different from (M−N−1) most significant bits of the first encoded information, where N is a positive integer greater than 0 and less than (M−1).

In one or more embodiments, the apparatus further includes: a second acquisition unit, which is configured to acquire a first node which does not have an optimal cooperation node in the same network when a node is added in the same network, after the cooperation node is selected, from the plurality of nodes, for the target node based on the first location information. The optimal cooperation node of one node has a same number of encoded bits as the one node and has (M−1) most significant bits different from (M−1) most significant bits of the one node, where M is a number of encoded bits of the one node.

In one or more embodiments, each node in the same network has at most two cooperation nodes.

In one or more embodiments, the apparatus further includes: a configuration unit, which is configured to configure encoded information for each node in the same network after the first location information of the target node is acquired.

In one or more embodiments, the configuration unit includes: a first configuration module, which is configured to acquire a tree network corresponding to the same network and configure encoded information Ni for a node at a second level of the tree network, where i is a serial number of the node at the second level, i is a positive integer, and the node at the second level is a subnode of the root node in the tree network; and a second configuration module, which is configured to configure encoded information Nkp for a node at a j-th level of the tree network, where j is a positive integer greater than 2, k is a serial number of a parent node of the node at the j-th level, and p is a positive integer.

In one or more embodiments, each node in the tree network is a terminal or a gateway.

Another embodiment of the present application provides a storage medium which may be configured to store program codes for executing the following steps: first location information of a target node is acquired when it is required to allocate a cooperation node to the target node; and the cooperation node satisfying a preset location requirement is selected, from a plurality of nodes, for the target node based on the first location information, where the plurality of nodes and the target node are located in a same network, and the preset location requirement refers to that the target node and the cooperation node do not have a common parent node or have a lowest-level common parent node closest to a root node.

In the present application, the first location information of the target node is acquired when it is required to allocate the cooperation node to the target node; and the cooperation node satisfying the preset location requirement is selected, from the plurality of nodes, for the target node based on the first location information, where the plurality of nodes and the target node are located in the same network, and the preset location requirement refers to that the target node and the cooperation node do not have the common parent node or have the lowest-level common parent node closest to the root node. In this way, the present application addresses the failure in data backup and recovery when a node fails and reduces influence of a failure on data backup and recovery.

BRIEF DESCRIPTION OF DRAWINGS

The drawings described herein are used to provide further understanding of the present application and form a part of the present application. The exemplary embodiments and descriptions thereof in the present application are used to explain the present application and not to limit the present application in any improper way. In the drawings.

DETAILED DESCRIPTION

The present application will be described hereinafter in detail through embodiments with reference to the drawings. It is to be noted that if not in collision, the embodiments and features therein in the present application may be combined with each other.

It is to be noted that the terms "first", "second" and the like in the description, claims and drawings of the present application are used to distinguish between similar objects and are not necessarily used to describe a particular order or sequence.

Embodiment 1

Figure 1:
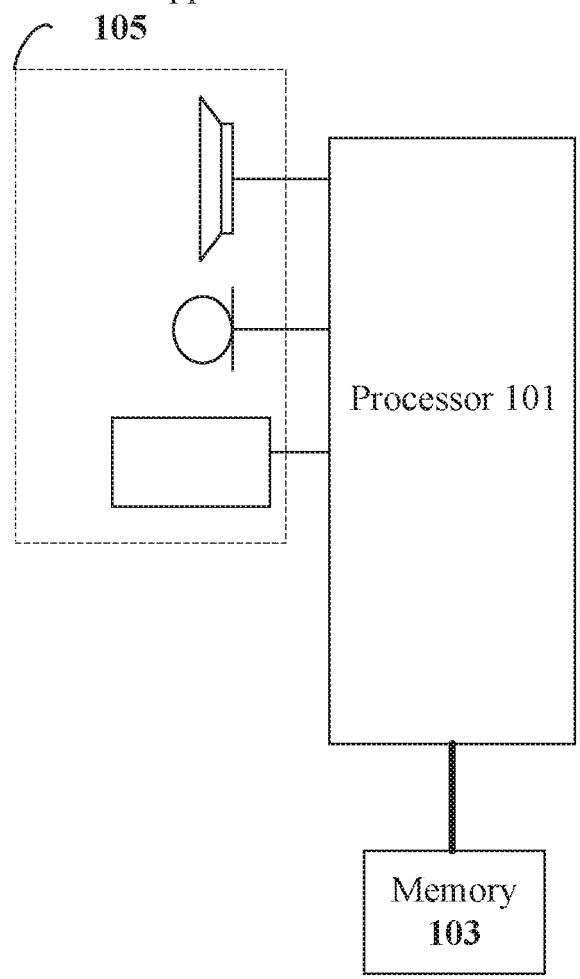
FIG. 1 is a schematic diagram of a terminal device according to the present application.

A method embodiment provided by an embodiment 1 of the present application may be implemented in a terminal device, a gateway or other similar computing devices. Taking the method to be executed in the terminal device as an example, as shown in FIG. 1, the terminal device may include one or more (only one is shown in FIG. 1) processors 101 (the processor 101 may include, but is not limited to, a processing device such as a microprocessor MCU or a programmable logic device FPGA), a memory 103 used for storing data, and a transmission apparatus 105 used for implementing a communication function. It will be understood by those skilled in the art that the structure shown in FIG. 1 is merely illustrative, and not intended to limit the structure of the electronic device described above.

The memory 103 may be used for storing software programs and modules of application software, such as program instructions/modules corresponding to a device control method in the present disclosure. The processor 101 executes the software programs and modules stored in the memory 103 so as to perform various function applications and data processing, that is, to implement the method described above. The memory may include a high-speed random access memory, and may further include a nonvolatile memory, such as one or more magnetic storage devices, flash memories or other nonvolatile solid-state memories. In some examples, the memory may further include memories which are disposed remotely relative to the processor and these remote memories may be connected to the terminal device via networks. Examples of the networks include, but are not limited to, the Internet, an intranet, a local area network, a mobile communication network and a combination thereof.

The transmission apparatus is used for receiving or transmitting data via one network. Specific examples of such a network may include a wireless network provided by a communication provider of the terminal device. In one example, the transmission apparatus includes a network interface controller (NIC), which may be connected to other network devices via a base station and thus be capable of communicating with the Internet. In one example, the transmission apparatus may be a radio frequency (RF) module, which is configured to communicate with the Internet in a wireless way.

In the related art, two nodes with a shortest or shorter physical distance are often selected as cooperation nodes of each other. For example, a ZigBee protocol specifies two nodes in direct communication within a range of one hop as the cooperation nodes of each other; an IPv6 protocol specifies two nodes connected through a shared medium or a point-to-point link as the cooperation nodes of each other; in addition, the cooperation node is also defined in a 6LoWPAN protocol and the like.

Hop count or physical distance is almost used as a criterion for selecting neighbors. In this way, the obtained neighbors (i.e., the cooperation nodes) can only ensure simpler, direct and low-delay information transmission between neighbors; two nodes, as neighbors of each other, are more likely to be simultaneously affected by a network abnormality. Therefore, when this neighbor selection method is used, a failure will affect data backup and recovery.

A method embodiment of a method for determining a cooperation node is provided in the present application. It is to be noted that the steps shown in the flowcharts in the accompanying drawings may be performed by a computer system such as a group of computers capable of executing instructions, and although logical sequences are shown in the flowcharts, the shown or described steps may be performed in sequences different from the sequences described herein in some cases.

Figure 2:
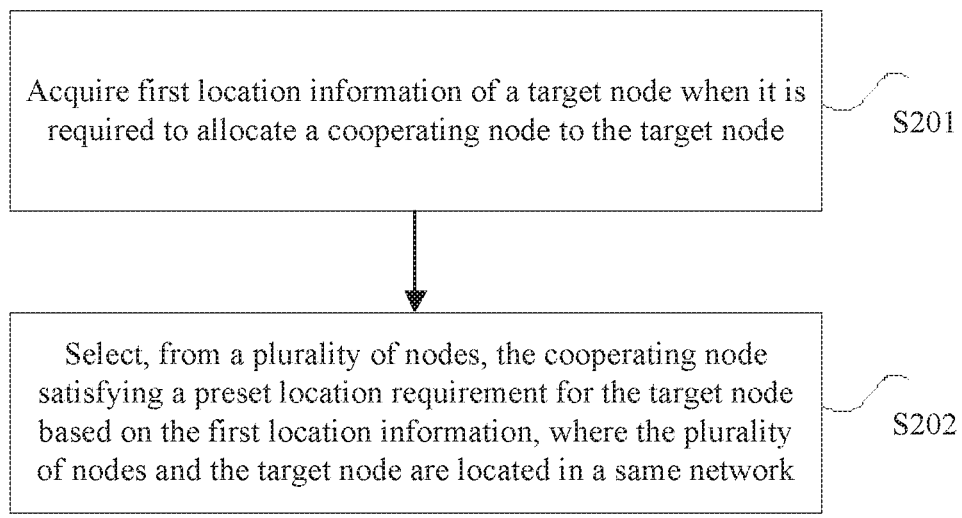
FIG. 2 is a flowchart of a method for determining a cooperation node according to the present application.

FIG. 2 is a flowchart of a method for determining a cooperation node according to the present application. As shown in FIG. 2, the method includes steps described below.

In step S201, when it is required to allocate a cooperation node to the target node, first location information of a target node is acquired.

In step S202, the cooperation node satisfying a preset location requirement is selected, from a plurality of nodes, for the target node based on the first location information, where the plurality of nodes and the target node are located in a same network, and the preset location requirement refers to that the target node and the cooperation node do not have a common parent node or have a lowest-level common parent node closest to a root node.

In the above embodiment, when it is required to allocate the cooperation node to the target node, the first location information of the target node is acquired; and the cooperation node satisfying the preset location requirement is selected, from the plurality of nodes, for the target node based on the first location information, where the plurality of nodes and the target node are located in the same network, and the preset location requirement refers to that the target node and the cooperation node do not have the common parent node or have the lowest-level common parent node closest to the root node. In this way, when a node fails, its cooperation node is not easy to be affected, which is favorable to failure data backup and recovery, thereby addressing the failure in data backup and recovery when a node fails and reducing influence of a failure on data backup and recovery.

In one or more embodiments, the above nodes may be a terminal, a gateway or other devices.

The above steps may be executed by the terminal, the gateway or the like, but it is not limited thereto. According to different service capabilities, the terminal devices may be divided into terminals and gateways. The terminal is a terminal device having service capabilities and a network communication function. The gateway is a terminal device that implements connections and interactions between terminal peripherals and a network with its applications by use of the service capabilities. The step S201 and step S202 may be performed directly on the same network, or may be performed on a tree network corresponding to the same network. If the same network is a network of any structure, the same network may be processed into a tree network by preprocessing (that is, the tree network is a logical spanning tree).

In the embodiment of the present application, in a tree network composed of nodes, each node requires and can only have one or two cooperation nodes and all data of the one or two cooperation nodes is stored on this node for backup, and all data of this node is also stored on the one or two cooperation nodes for backup. When a node failure results in a disconnection of link and a failure in data uploading, necessary data may be recovered and uploaded from the cooperation nodes to a maximum extent.

It is to be noted that when a network is constructed, all nodes may be subject to node encoding (through which an affinity relationship between the nodes may be determined), and then a neighbor selection operation is started from any node until each node has at least one node as neighbor. When the network topology changes, the node encoding needs to be performed on a newly-added node, and then cooperation nodes are selected again for a node without a neighbor and a node whose cooperation node is not optimal cooperation nodes after the topology change.

After the step S201 in which the first location information of the target node is acquired, encoded information may be configured for each node in the same network in the following manner: a tree network corresponding to the same network is acquired; encoded information Ni is configured for all nodes at a second level of the tree network, where i is a serial number of the node at the second level, i is a positive integer, and each node at the second level is a subnode of the root node in the tree network; and encoded information Nkp is configured for all nodes at a j-th level of the tree network, where j is a positive integer greater than 2, k is a serial number of a parent node of the node at the j-th level, and p is a positive integer.

Figure 3:
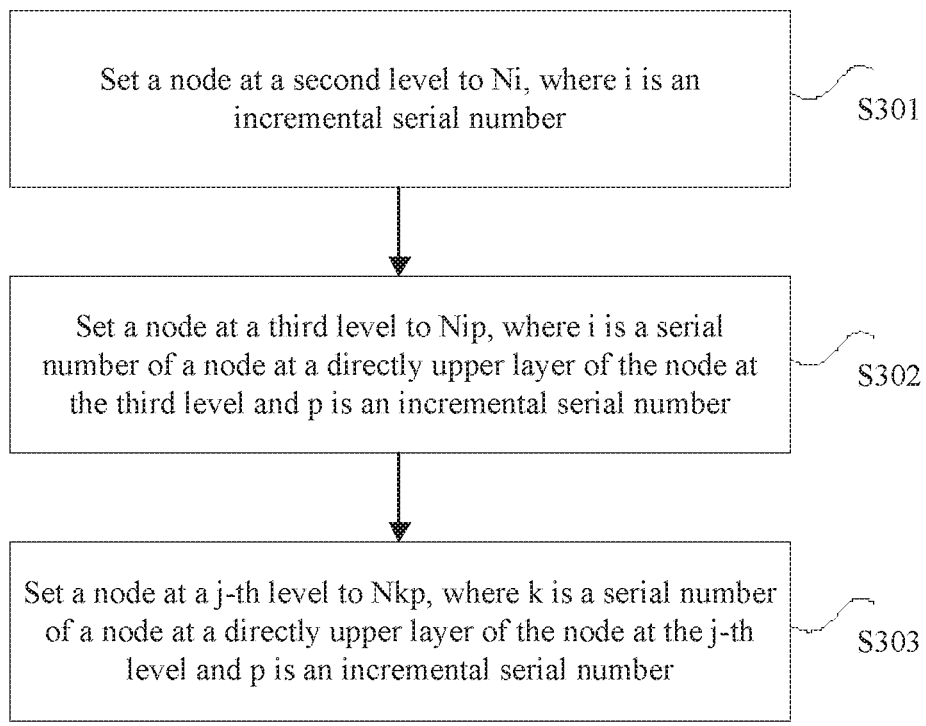
FIG. 3 is a flowchart of an optional method for determining a cooperation node according to the present application.

In one or more embodiments, as shown in FIG. 3 (the root node is N), the encoded information is configured as follows:

In step S301, a node at the second level is set to Ni, where i is an incremental serial number.

In step S302, a node at a third level is set to Nip, where i is a serial number of a node at a directly upper layer of the node at the third level, p is an incremental serial number, and i is a more significant bit than p.

In step S303, the node at the j-th level is set to Nkp, where k is a serial number of a node at a directly upper layer of the node at the j-th level and p is an incremental serial number. This step is repeated until all nodes are set.

A specific example for implementation in the above steps is given below.

In step 11, nodes (at the second level) subordinate to the root node are encoded as N1, N2, N3 . . . .

In step 12, nodes (at the third level) subordinate to the nodes at the second level are encoded as follows: nodes subordinate to N1 are N11, N12, N13 . . . ; nodes subordinate to N2 are N21, N22, N23 . . . ; and nodes subordinate to N3 are N31, N32, N33 . . . .

In step 13, nodes (at a fourth level) subordinate to the nodes at the third level are encoded as follows: nodes subordinate to N11 are N111, N112, N113 . . . ; nodes subordinate to N12 are N121, N122, N123 . . . ; and nodes subordinate to N13 are N131, N132, N133 . . . ; nodes N21, N22, N23, N31, N32 and N33 are encoded in the same manner.

In step 14, nodes at a fifth level, a sixth level and so on are encoded according to the above rules until all nodes are encoded.

Figure 4:
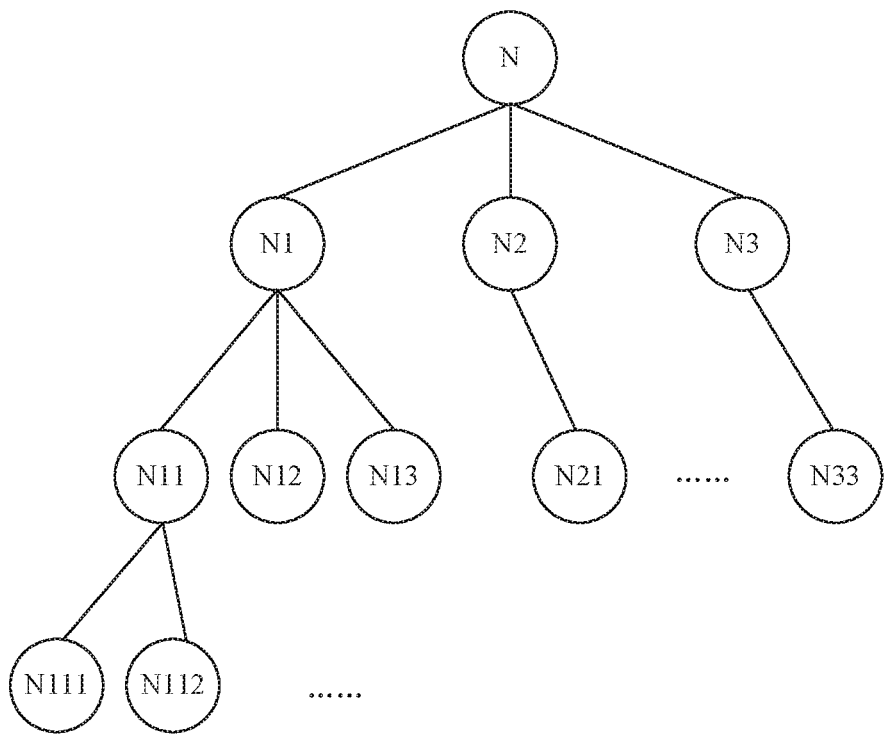
FIG. 4 is a structural diagram of an optional tree network according to the present application.

The tree network encoded according to the embodiment has the structure shown in FIG. 4 (N is the root node). The nodes are numbered according to a failure scenario and the affinity relationship between the nodes can be determined based on the above node codes so as to facilitate the neighbor selection. Therefore, data backup and recovery may be conducted through communication between the cooperation nodes after the neighbors are selected.

In one or more embodiments, when a tree network is newly constructed, all nodes in the tree network are first encoded by the above node encoding method. After the node encoding is completed, the neighbor selection operation is performed on an arbitrary node to obtain its cooperation node. Then, the neighbor selection operation is performed on the next arbitrary node without a cooperation node until all the nodes have at least one cooperation node. Each node then starts data backup on its cooperation node and receives and stores backup data of its cooperation node.

A specific selection manner of a logic cooperation node is described as above in the step S202. The step in which the cooperation node satisfying the preset location requirement is selected, from the plurality of nodes, for the target node based on the first location information includes: acquiring a plurality of pieces of second location information of the plurality of nodes, where each of the plurality of nodes corresponds to one piece of second location information; and selecting, from the plurality of nodes and based on the plurality of pieces of second location information and the first location information, a node satisfying the preset location requirement as the cooperation node.

The above step of selecting, from the plurality of nodes and based on the plurality of pieces of second location information and the first location information, the node satisfying the preset location requirement as the cooperation node includes: acquiring first encoded information for representing the first location information and a plurality of pieces of second encoded information for representing the plurality of pieces of second location information; comparing, from a most significant bit, a plurality of encoded bits of the first encoded information with a plurality of encoded bits of each of the plurality of pieces of second encoded information, and searching the plurality of pieces of second encoded information for target encoded information having a maximum number of continuous non-coincident encoded bits with the first encoded information from the most significant bit; and taking a node corresponding to the target encoded information as the cooperation node.

In one or more embodiments, the step of comparing, from the most significant bit, the plurality of encoded bits of the first encoded information with the plurality of encoded bits of each of the plurality of pieces of second encoded information, and searching the plurality of pieces of second encoded information for the target encoded information having the maximum number of continuous non-coincident encoded bits with the first encoded information from the most significant bit includes: determining a number M of encoded bits of the first encoded information; determining whether the plurality of pieces of second encoded information contains at least one piece of second encoded information having the number M of encoded bits; when it is determined that the plurality of pieces of second encoded information contains the at least one piece of second encoded information having the number M of encoded bits, acquiring, from the at least one piece of second encoded information having the number M of encoded bits, the target encoded information having (M−1) most significant bits different from (M−1) most significant bits of the first encoded information; when it is determined that the plurality of pieces of second encoded information does not contain a piece of second encoded information having the number M of encoded bits, or when failing to acquire, from the at least one piece of second encoded information having the number M of encoded bits, the target encoded information having (M−1) most significant bits different from (M−1) most significant bits of the first encoded information, acquiring, from at least one piece of second encoded information having a number (M−1) of encoded bits, the target encoded information having (M−2) most significant bits different from (M−2) most significant bits of the first encoded information; and when failing to acquire, from at least one piece of second encoded information having a number (M−N) of encoded bits, the target encoded information having (M−N−1) most significant bits different from (M−N−1) most significant bits of the first encoded information, acquiring, from at least one piece of second encoded information having a number (M−N−1) of encoded bits, the target encoded information having (M−N−2) most significant bits different from (M−N−2) most significant bits of the first encoded information, where N is a positive integer greater than 0 and less than (M−1).

Figure 5:
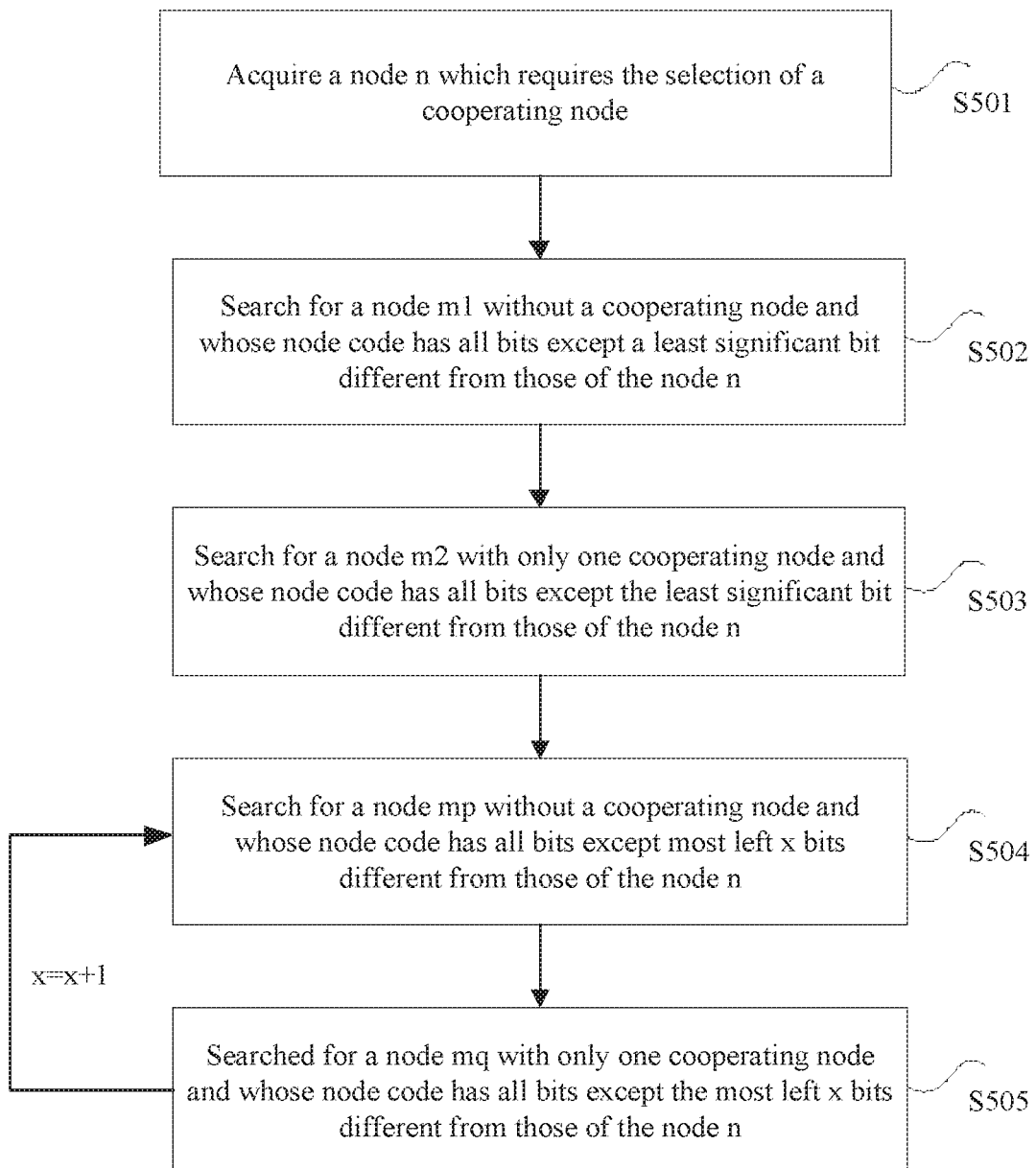
FIG. 5 is a flowchart of an optional method for determining a cooperation node according to the present application.

The embodiment of the present application is described in detail below in conjunction with FIG. 5. As shown in FIG. 5, the steps described below are included.

In step S501, a node n which requires the selection of a cooperation node is acquired.

In step S502, a plurality of nodes are searched for a node m1 without a cooperation node and whose node code has all bits except a least significant bit different from those of the node n. If the node m1 exists, the node m1 is determined as the cooperation node of the node n; otherwise, the next step is performed.

In step S503, the plurality of nodes are searched for a node m2 with only one cooperation node and whose node code has all bits except the least significant bit different from those of the node n. If the node m2 exists, the node m2 is determined as the cooperation node of the node n; otherwise, the next step is performed.

In step S502 and step S503, a node m (including m1 and m2) is searched for under a global constraint condition that the node m has a same number of encoded bits as the node n.

However, when a proper cooperation node cannot be found after all nodes at a same level are traversed in step S502 and step S503, the global constraint condition for the node m becomes that the node m has one less encoded bits than those of the node n, and then node selection is performed as described in step S504 and step S505.

In step S504, a plurality of nodes are searched for a node mp without a cooperation node and whose node code has all bits except most left x bits (most significant x bits) different from those of the node n. If the node mp exists, the node mp is determined as the cooperation node of the node n; otherwise, the next step is performed.

In step S505, the plurality of nodes are searched for a node mq with only one cooperation node and whose node code has all bits except the most left x bits different from those of the node n. If the node mq exists, the node mq is determined as the cooperation node of the node n; otherwise, x=x+1 and the step S504 is performed again.

If the proper cooperation node still cannot be found, the global constraint for the node m becomes that the node m has two less encoded bits than those of the node n, and the number of encoded bits of the node m is decreased until the node m satisfying the preset location requirement is found as the neighbor of the node n.

After the cooperation node m is found, if the node m has the same number of encoded bits as the node n and has all bits except the least signification bit different from those of the node n, the node m and the node n are optimal cooperation nodes of each other; if the above requirement is not satisfied, the node m and the node n are not the optimal cooperation nodes of each other.

In one or more embodiments, after the cooperation node is selected, from the plurality of nodes, for the target node based on the first location information, when a node is added in the tree network, a first node which does not have an optimal cooperation node in the tree network is acquired. The optimal cooperation node of one node has a same number of encoded bits as the one node and has (M−1) most significant bits different from (M−1) most significant bits of the one node, where M is a number of encoded bits of the one node. When both the cooperation nodes of a certain node are not its optimal cooperation nodes, a cooperation node is selected again for this node when the network topology changes next time.

It is to be noted that after the cooperation node satisfying the preset location requirement is selected, from the plurality of nodes, for the target node based on the first location information, or after the cooperation node is re-allocated to the first node, each node in the tree network has at most two cooperation nodes.

Figure 6:
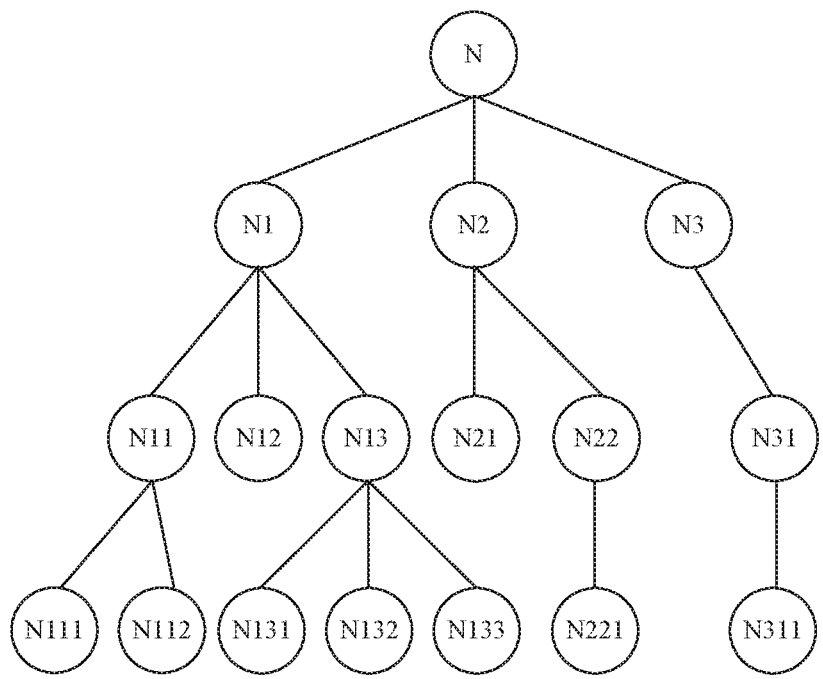
FIG. 6 is a structural diagram of an optional tree network according to the present application.

If the tree network has the structure shown in FIG. 6 (N is the root node), after the neighbor selection operation is performed on all nodes, neighbor pairs (that is, the nodes which are mutual cooperation nodes) are listed as follows: N1 and N2, N2 and N3, N11 and N21, N12 and N22, N13 and N31, N111 and N221, N111 and N133, N112 and N311, N131 and N221, N132 and N311.

The cooperation node of N133 is not its optimal cooperation node.

Figure 7:
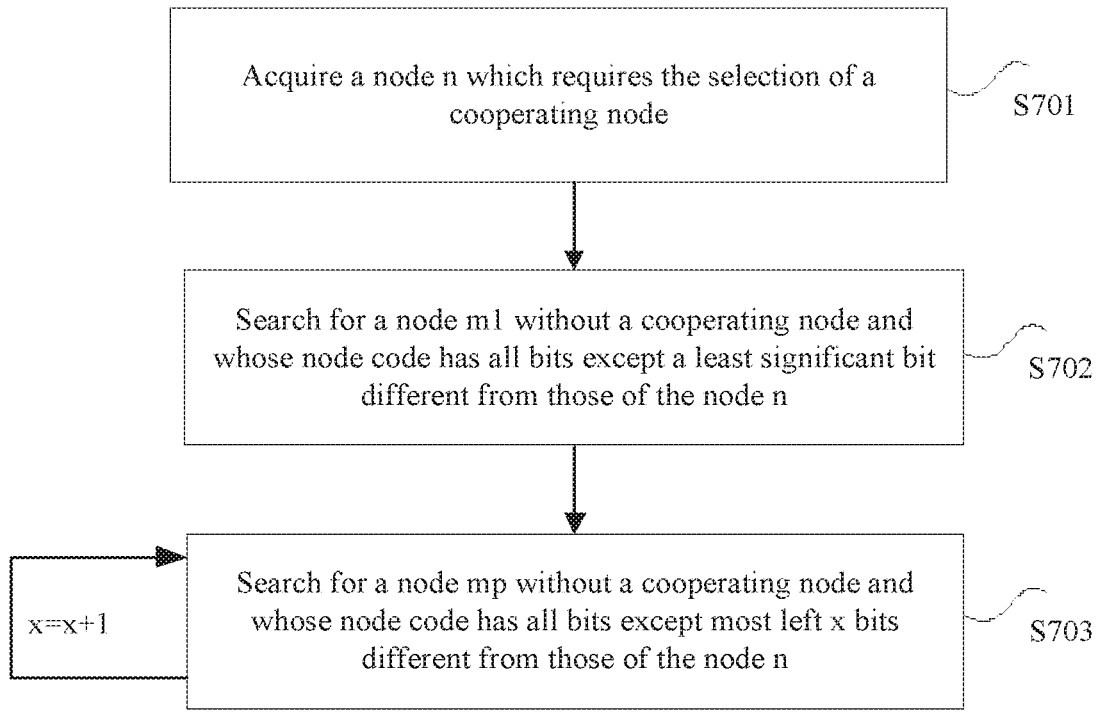
FIG. 7 is a flowchart of an optional method for determining a cooperation node according to the present application.

In one or more embodiments, when a storage space of each node only supports data backup of one other node, each node can only have one cooperation node. In this case, the method for selecting the cooperation node is as shown in FIG. 7.

In step S701, a node n which requires the selection of a cooperation node is acquired.

In step S702, a plurality of nodes are searched for a node m1 without a cooperation node and whose node code has all bits except a least significant bit different from those of the node n. If the node m1 exists, the node m1 is determined as the cooperation node of the node n; otherwise, the next step is performed.

In step S703, a plurality of nodes are searched for a node mp without a cooperation node and whose node code has all bits except most left x bits different from those of the node n. If the node mp exists, the node mp is determined as the cooperation node of the node n; otherwise, x=x+1 and the step S703 is performed again.

If the tree network has the structure shown in FIG. 6 (N is the root node), after the neighbor selection operation is performed on all nodes, the neighbor pairs (which may be different according to different traverse manners) are listed as follows: N1 and N2, N11 and N22, N12 and N31, N13 and N21, N111 and N221, N112 and N132, N131 and N133. N3 has no cooperation node, and the cooperation nodes of N112, N132, N131 and N133 are all not their optimal cooperation nodes.

In the above embodiment, the affinity relationship of the entire tree network may be combed based on the node codes, and a relationship between two nodes may be determined through node codes, which greatly increases efficiency of neighbor selection efficiency. When the neighbor selection is performed, a most applicable neighbor which is available in the current network can be found for one node. The most applicable neighbor is different from an optimal neighbor. The most applicable neighbor may be the optimal neighbor or not. However, the most applicable neighbor must be a most distant node from the one node in the current network, that is, a node which has a smallest possibility to be affected simultaneously by a network failure. When a node or a link in the network fails, it is less possible that the matched two cooperation nodes as mutual neighboring nodes are simultaneously affected, thereby significantly improving backup availability.

From the description of the implementation modes described above, it will be apparent to those skilled in the art that the method in the embodiment described above may be implemented by software plus a necessary general-purpose hardware platform, or may of course be implemented by hardware. However, in many cases, the former is a preferred implementation mode. Based on this understanding, the present application substantially, or the part contributing to the existing art, may be embodied in the form of a software product. The software product is stored on a storage medium (such as a ROM/RAM, a magnetic disk or an optical disk) and includes several instructions for enabling a terminal device (which may be a mobile phone, a computer, a server or a network device) to execute the method according to each embodiment of the present application.

Embodiment 2

The present application further provides an apparatus for determining a cooperation node. The apparatus is used for implementing the above-mentioned embodiments and preferred embodiments. What has been described will not be repeated. As used below, a term "module" may be software, hardware or a combination thereof capable of implementing predetermined functions. The apparatus in the embodiment described below is preferably implemented by software, but implementation by hardware or by a combination of software and hardware is also possible and conceived.

Figure 8:
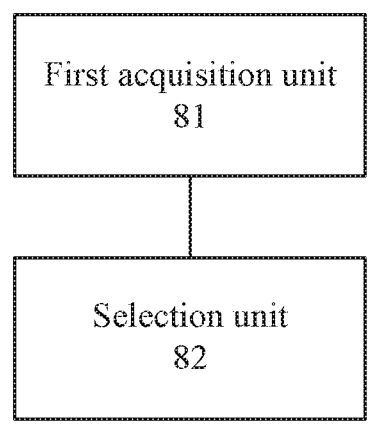
FIG. 8 is a schematic diagram of an apparatus for determining a cooperation node according to the present application.

FIG. 8 is a schematic diagram of an apparatus for determining a cooperation node according to the present application. As shown in FIG. 8, the apparatus includes a first acquisition unit 81 and a selection unit 82.

The first acquisition unit 81 is configured to acquire first location information of a target node when it is required to allocate a cooperation node to the target node.

The selection unit 82 is configured to select, from a plurality of nodes, the cooperation node satisfying a preset location requirement for the target node based on the first location information, where the plurality of nodes and the target node are located in a same network, and the preset location requirement refers to that the target node and the cooperation node do not have a common parent node or have a lowest-level common parent node closest to a root node.

In the above embodiment, the first acquisition unit 81 acquires the first location information of the target node when it is required to allocate the cooperation node to the target node; and the selection unit 82 selects, from the plurality of nodes, the cooperation node satisfying the preset location requirement for the target node based on the first location information, where the plurality of nodes and the target node are located in the same network, and the preset location requirement refers to that the target node and the cooperation node do not have the common parent node or have the lowest-level common parent node closest to the root node. In this way, the apparatus addresses the failure in data backup and recovery when a node fails and reduces influence of a failure on data backup and recovery.

In an embodiment of the present application, in a tree network composed of nodes, each node requires and can only have one or two cooperation nodes and all data of the one or two cooperation nodes is stored on this node for backup, and all data of this node is also stored on the one or two cooperation nodes for backup. When a node failure results in disconnection of link and a failure in data uploading, necessary data may be recovered and uploaded from the cooperation nodes to a maximum extent.

It is to be noted that when a network is constructed, all nodes may be subject to node encoding (through which an affinity relationship between the nodes may be determined), and then a neighbor selection operation is started from any node until all nodes have at least one node as their neighbors. When the network topology changes, the node encoding needs to be performed on a newly-added node, and then cooperation nodes are selected again for a node without a neighbor and a node whose cooperation nodes both are not optimal cooperation nodes after the topology change.

In one or more embodiments, the apparatus in the present application further includes a configuration unit. The configuration unit is configured to configure encoded information for each node in the same network after the first location information of the target node is acquired.

In one or more embodiments, the configuration unit includes a first configuration module and a second configuration module. The first configuration module is configured to acquire a tree network corresponding to the same network and configure encoded information Ni for a node at a second level of the tree network, where i is a serial number of the node at the second level, i is a positive integer, and the node at the second level is a subnode of the root node in the tree network. The second configuration module is configured to configure encoded information Nkp for a node at a j-th level of the tree network, where j is a positive integer greater than 2, k is a serial number of a parent node of the node at the j-th level, and p is a positive integer.

In one or more embodiments, each node in the tree network has at most two cooperation nodes.

In the above embodiment, the selection unit includes an acquisition module and a selection module. The acquisition module is configured to acquire a plurality of pieces of second location information of the plurality of nodes, where each of the plurality of nodes corresponds to one piece of second location information. The selection module is configured to select, from the plurality of nodes and based on the plurality of pieces of second location information and the first location information, a node satisfying the preset location requirement as the cooperation node. The acquisition module is configured to acquire the plurality of pieces of second location information of the plurality of nodes, where each of the plurality of nodes corresponds to one piece of second location information. The selection module is configured to select, from the plurality of nodes and based on the plurality of pieces of second location information and the first location information, a node with lowest location relevance to the target node as the cooperation node.

In one or more embodiments, the selection module includes a first acquisition submodule, a search submodule and an operation submodule. The first acquisition submodule is configured to acquire first encoded information for representing the first location information and a plurality of pieces of second encoded information for representing the plurality of pieces of second location information. The search submodule is configured to compare, from a most significant bit, a plurality of encoded bits of the first encoded information with a plurality of encoded bits of each of the plurality of pieces of second encoded information, and search the plurality of pieces of second encoded information for target encoded information having a maximum number of continuous non-coincident encoded bits with the first encoded information from the most significant bit. The operation submodule is configured to take a node corresponding to the target encoded information as the cooperation node.

In one or more embodiments, the search submodule includes a determination submodule, a determining submodule, a second acquisition submodule, a third acquisition submodule and a fourth acquisition submodule. The determination submodule is configured to determine a number M of encoded bits of the first encoded information. The determining submodule is configured to determine whether the plurality of pieces of second encoded information contains at least one piece of second encoded information having the number M of encoded bits. The second acquisition submodule is configured to acquire, from the at least one piece of second encoded information having the number M of encoded bits, the target encoded information having (M−1) most significant bits different from (M−1) most significant bits of the first encoded information when it is determined that the plurality of pieces of second encoded information contains the at least one piece of second encoded information having the number M of encoded bits. The third acquisition submodule is configured to acquire, from at least one piece of second encoded information having a number (M−1) of encoded bits, the target encoded information having (M−2) most significant bits different from (M−2) most significant bits of the first encoded information when it is determined that the plurality of pieces of second encoded information does not contain a piece of second encoded information having the number M of encoded bits, or when the second acquisition submodule fails to acquire, from the at least one piece of second encoded information having the number M of encoded bits, the target encoded information having (M−1) most significant bits different from (M−1) most significant bits of the first encoded information. The fourth acquisition submodule is configured to acquire, from at least one piece of second encoded information having a number (M−N−1) of encoded bits, the target encoded information having (M−N−2) most significant bits different from (M−N−2) most significant bits of the first encoded information, when failing to acquire, from at least one piece of second encoded information having a number (M−N) of encoded bits, the target encoded information having (M−N−1) most significant bits different from (M−N−1) most significant bits of the first encoded information, where N is a positive integer greater than 0 and less than (M−1).

In an optional embodiment, the apparatus in the present application further includes a second acquisition unit. The second acquisition unit is configured to acquire a first node which does not have an optimal cooperation node in the tree network when a node is added in the tree network, after the cooperation node is selected, from the plurality of nodes, for the target node based on the first location information. The optimal cooperation node of one node has a same number of encoded bits as the one node and has (M−1) most significant bits different from (M−1) most significant bits of the one node, where M is a number of encoded bits of the one node.

It is to be noted that the various modules described above may be implemented by software or hardware. Implementation by hardware may, but may not necessarily, be performed in the following manners: the various modules described above are located in a same processor or in their respective processors in any combination form.

Embodiment 3

An embodiment of the present application further provides a storage medium. In this embodiment, the storage medium may be configured to store program codes for executing the steps described below.

In step S1, first location information of a target node is acquired when it is required to allocate a cooperation node to the target node.

In step S2, the cooperation node satisfying a preset location requirement is selected, from a plurality of nodes, for the target node based on the first location information, where the plurality of nodes and the target node are located in a same tree network, and the preset location requirement refers to that the target node and the cooperation node do not have a common parent node or have a lowest-level common parent node closest to a root node.

In this embodiment, the storage medium may include, but is not limited to, a U disk, a read-only memory (ROM), a random access memory (RAM), a mobile hard disk, a magnetic disk, an optical disk or another medium capable of storing program codes.

In this embodiment, a processor executes, according to the program codes stored in the storage medium, the following steps: first location information of a target node is acquired when it is required to allocate a cooperation node to the target node; and the cooperation node satisfying a preset location requirement is selected, from a plurality of nodes, for the target node based on the first location information, where the plurality of nodes and the target node are located in a same tree network, and the preset location requirement refers to that the target node and the cooperation node do not have a common parent node or have a lowest-level common parent node closest to a root node.

For specific examples in this embodiment, reference may be made to the examples described in the above embodiments and optional implementation modes, and repetition will not be made in this embodiment.

Apparently, it should be understood by those skilled in the art that each of the above-mentioned modules or steps of the present application may be implemented by a general-purpose computing device, the modules or steps may be concentrated on a single computing device or distributed on a network composed of multiple computing devices, and alternatively, the modules or steps may be implemented by program codes executable by the computing devices, so that the modules or steps may be stored in a storage device and executable by the computing devices. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present application is not limited to any specific combination of hardware and software.

The above are only preferred embodiments of the present application and are not intended to limit the present application, and for those skilled in the art, the present application may have various modifications and variations. Any modifications, equivalent substitutions, improvements and the like made within the spirit and principle of the present application should fall within the scope of the present application.

What is clamied is:

1. A method for determining a cooperating node, comprising:
   acquiring first location information of a target node when it is required to allocate a cooperating node to the target node; and
   selecting, from a plurality of nodes, the cooperating node satisfying a preset location requirement for the target node based on the first location information, wherein the plurality of nodes and the target node are located in a same network, and the preset location requirement refers to that the target node and the cooperating node do not have a common parent node or have a lowest-level common parent node closest to a root node;
   wherein the selecting, from a plurality of nodes, the cooperating node satisfying a preset location requirement for the target node based on the first location information comprises:
      acquiring a plurality of pieces of second location information of the plurality of nodes, wherein each of the plurality of nodes corresponds to one piece of second location information; and selecting, from the plurality of nodes and based on the plurality of pieces of second location information and the first location information, a node satisfying the preset location requirement as the cooperating node;
   wherein the selecting, from the plurality of node and based on the plurality of pieces of second location information and the first location information, a node satisfying the preset location requirement as the cooperating node comprises:
      acquiring first encoded information for representing the first location information and a plurality of pieces of second encoded information for representing the plurality of pieces of second location information; comparing, from a most significant bit, a plurality of encoded bits of the first encoded information with a plurality of encoded bits of each of the plurality of pieces of second encoded information, and searching the plurality of pieces of second encoded information for target encoded information having a maximum number of continuous non-coincident encoded bits with the first encoded information from the most significant bit and taking a node corresponding to the target encoded information as the cooperating node.

2. The method of claim 1, wherein the comparing, from a most significant bit, a plurality of encoded bits of the first encoded information with a plurality of encoded bits of each of the plurality of pieces of second encoded information, and searching the plurality of pieces of second encoded information for target encoded information having a maximum number of continuous non-coincident encoded bits with the first encoded information from the most significant bit comprises:

determining a number M of encoded bits of the first encoded information;
determining whether the plurality of pieces of second encoded information contains at least one piece of second encoded information having the number M of encoded bits;
when it is determined that the plurality of pieces of second encoded information contains the at least one piece of second encoded information having the number M of encoded bits, acquiring, from the at least one piece of second encoded information having the number M of encoded bits, the target encoded information having (M−1) most significant bits different from (M−1) most significant bits of the first encoded information;
when it is determined that the plurality of pieces of second encoded information does not contain a piece of second encoded information having the number M of encoded bits, or when failing to acquire, from the at least one piece of second encoded information having the number M of encoded bits, the target encoded information having (M−1) most significant bits different from (M−1) most significant bits of the first encoded information, acquiring, from at least one piece of second encoded information having a number (M−1) of encoded bits, the target encoded information having (M−2) most significant bits different from (M−2) most significant bits of the first encoded information; and
when failing to acquire, from at least one piece of second encoded information having a number (M−N) of encoded bits, the target encoded information having (M−N−1) most significant bits different from (M−N−1) most significant bits of the first encoded information, acquiring, from at least one piece of second encoded information having a number (M−N−1) of encoded bits, the target encoded information having (M−N−2) most significant bits different from (M−N−2) most significant bits of the first encoded information, wherein N is a positive integer greater than 0 and less than (M−1).

3. The method of claim 1, wherein after the selecting, from a plurality of nodes, the cooperating node satisfying a preset location requirement for the target node based on the first location information, the method further comprises:

when a node is added in the same network, acquiring a first node which does not have an optimal cooperating node in the same network; and
re-allocating the cooperating node to the first node.

4. The method of claim 3, wherein the optimal cooperating node of one node has a same number of encoded bits as the one node and has (M−1) most significant bits different from (M−1) most significant bits of the one node, wherein M is a number of encoded bits of the one node.

5. The method of claim 3, wherein after the selecting, from a plurality of nodes, the cooperating node satisfying a preset location requirement for the target node based on the first location information, or after the re-allocating the cooperating node to the first node, each node in the same network has at most two cooperating nodes.

6. The method of claim 1, wherein after the acquiring first location information of a target node, the method further comprises:

configuring encoded information for each node in the same network.

7. The method of claim 6, wherein the configuring encoded information for each node in the same network comprises:

acquiring a tree network corresponding to the same network and configuring encoded information Ni for a node at a second level of the tree network, wherein i is a serial number of the node at the second level, i is a positive integer, and the node at the second level is a subnode of the root node in the tree network; and
configuring, encoded information Nkp for a node at a j-th level of the tree network, wherein j is a positive integer greater than 2, k is a serial number of a parent node of the node at the j-th level, and p is a positive integer.

8. The method of claim 1, wherein each node in the same network is a terminal or a gateway.

9. The method of claim 1, wherein the method for determining the cooperating node is applied to any node in the same network.

10. An apparatus for determining a cooperating node, comprising a processor and a storage device, wherein the storage device stores processor-executable programs, and the programs comprise:

a first acquisition unit, which is configured to acquire first location information of a target node when it is required to allocate a cooperating node to the target node; and
a selection unit, which is configured to select, from a plurality of nodes, the cooperating node satisfying a preset location requirement for the target node based on the first location information, wherein the plurality of nodes and the target node are located in a same network, and the preset location requirement refers to that the target node and the cooperating node do not have a common parent node or have a lowest-level common parent node closest to a root node;
wherein the selection unit comprises:
an acquisition module, which is configured to acquire a plurality of pieces of second location information of the plurality of nodes, wherein each of the plurality of nodes corresponds to one piece of second location information; and a selection module, which is configured to select, from the plurality of nodes and based on the plurality of pieces of second location information and the first location information, a node satisfying the preset location requirement as the cooperating node;
wherein the selection module comprises:
a first acquisition submodule, which is configured to acquire first encoded information for representing the first location information and a plurality of pieces of second encoded information for representing the plurality of pieces of second location information; a search submodule, which is configured to compare, from a most significant bit, a plurality of encoded bits of the first encoded information with a plurality of encoded bits of each of the plurality of pieces of second encoded information, and search the plurality of pieces of second encoded information for target encoded information having a maximum number of continuous non-coincident encoded bits with the first encoded information from the most significant bit and an operation submodule, which is configured to take a node corresponding to the target encoded information as the cooperating node.

11. The apparatus of claim 10, wherein the search submodule comprises:
a determination submodule, which is configured to determine a number M of encoded bits of the first encoded information;
a determining submodule, which is configured to determine whether the plurality of pieces of second encoded information contains at least one piece of second encoded information having the number M of encoded bits;
a second acquisition submodule, which is configured to acquire, from the at least one piece of second encoded information having the number M of encoded bits, the target encoded information having (M−1) most significant bits different from (M−1) most significant bits of the first encoded information when it is determined that the plurality of pieces of second encoded information contains the at least one piece of second encoded information having the number M of encoded bits;
a third acquisition submodule, which is configured to acquire, from at least one piece of second encoded information having a number (M−1) of encoded bits, the target encoded information having (M−2) most significant bits different from (M−2) most significant bits of the first encoded information when it is determined that the plurality of pieces of second encoded information does not contain a piece of second encoded information having the number M of encoded bits, or when the second acquisition submodule fails to acquire, from the at least one piece of second encoded information having the number M of encoded bits, the target encoded information having (M−1) most significant bits different from (M−1) most significant bits of the first encoded information; and
a fourth acquisition submodule, which is configured to acquire, from at least one piece of second encoded information having a number (M−N−1) of encoded bits, the target encoded information having (M−N−2) most significant bits different from (M−N−2) most significant bits of the first encoded information, when failing to acquire, from at least one piece of second encoded information having a number (M−N) of encoded bits, the target encoded information having (M−N−1) most significant bits different from (M−N−1) most significant bits of the first encoded information, wherein N is a positive integer greater than 0 and less than (M−1).

12. The apparatus of claim 10, further comprising:
a second acquisition unit, which is configured to acquire a first node which does not have an optimal cooperating node in the same network when a node is added in the same network, after the cooperating node is selected, from the plurality of nodes, for the target node based on the first location information; and
an allocation unit, which is configured to re-allocate the cooperating node to the first node.

13. The apparatus of claim 12, wherein the optimal cooperating node of one node has a same number of encoded bits as the one node and has (M−1) most significant bits different from (M−1) most significant bits of the one node, wherein M is a number of encoded bits of the one node.

14. The apparatus of claim 12, wherein each node in the same network has at most two cooperating nodes.

15. The apparatus of claim 10, further comprising:
a configuration unit, which is configured to configure encoded information for each node in the same network after the first location information of the target node is acquired.

16. The apparatus of claim 15, wherein the configuration unit comprises:
a first configuration module, which is configured to acquire a tree network corresponding to the same network and configure encoded information Ni for a node at a second level of the tree network, wherein i is a serial number of the node at the second level, i is a positive integer, and the node at the second level is a subnode of the root node in the tree network; and
a second configuration module, which is configured to configure encoded information Nkp for a node at a j-th level of the tree network, wherein j is a positive integer greater than 2, k is a serial number of a parent node of the node at the j-th level, and p is a positive integer.

17. The apparatus of claim 10, wherein each node in the same network is a terminal or a gateway.

* * * * *